United States Patent Office 3,138,593
Patented June 23, 1964

3,138,593
4,5-DIHYDRO-6-(5-NITRO-2-FURYL)-AS-TRIAZIN- OR PYRIDAZIN-3-(2H)-ONE
Homer A. Burch, Norwich, N.Y., assignor to The Norwich Pharmacal Company, a corporation of New York
No Drawing. Filed Apr. 2, 1962, Ser. No. 184,490
3 Claims. (Cl. 260—248)

This invention relates to new nitrofuran compounds of the formula:

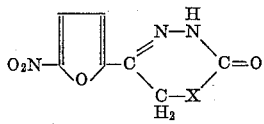

wherein X stands for the methylene or imido radical and to methods for the preparation thereof. These nitrofurans are potent antimicrobial agents; inhibiting, in very small amounts, a wide spectrum of microorganisms when tested in accordance with the commonly used serial dilution technique for detecting and quantiating significant antibacterial potency as illustrated in the following table:

| Microorganism: | Minimum inhibiting concentration in mg., percent |
|---|---|
| Escherichia coli | 0.2–0.3 |
| Salmonella typhosa | 0.3–0.6 |
| Proteus vulgaris | 10–20 |
| Streptococcus pyogenes | 5–10 |
| Straphylococcus aureus | 0.6–1.3 |
| Erysipelothrix insidiosa | 1.3–10 |

They may be used as the active agent of disinfectant compositions.

These nitrofurans are not limited to in vitro potency. They are capable of combatting systemic infections when administered orally to an infected host. Infections caused by bacterial and protozoal pathogens, such as *Staphylococcus aureus, Salmonella typhosa* or *Eimeria tenella*, are effectively combatted by dosages of these compounds far less than those eliciting adverse host response. Thus, the peroral dose sufficient to prevent death in mice lethally infected with *Salmonella typhosa* or *Straphylococcus aureus* ranges from about 52.5 to about 105 mg./kg. In chickens infected with or exposed to *Eimeria tenella* these nitrofuran compounds prevent mortality and morbidity associated with cecal coccidiosis when offered in the diet in a concentration of 0.022% by weight.

These nitrofurans may be readily formulated with excipients and adjuvants commonly employed to provide conveniently dispensable forms. Such forms are represented by tablets, elixiers, powders, capsules, suspensions, solutions and the feed and drinking water of domestic animals.

The method of producing the nitrofurans of this invention comprises the nitration of the corresponding furan compound. As nitrants, those acids and mixtures of acids and anhydrides may be used which do not adversely affect the furan nucleus. Among suitable nitrants in this instance are concentrated nitric acid and a mixture of concentrated nitric acid and sulfuric acid.

The furan intermediate is conveniently prepared by reacting a compound of the formula:

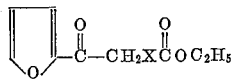

wherein X represents a methylene or imido radical with hydrazine or hydrazine hydrate preferably in the presence of a solvent, such as ethanol, and under the influence of heat to hasten the reaction. In this manner condensation and dealcoholation are effected to bring about the desired intermediate of the formula:

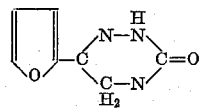

wherein X has the significance above.

The now preferred method for converting the furan intermediate to its nitro derivative is varied with respect to X:

(a) When X is methylene, nitration is readily effected by the use of mixed acid observing the conditions and steps normally practiced under such nitration; and (b) When X is imido, nitration is carried out by means of concentrated nitric acid in the presence of an inert solvent such as chloroform observing the requisite care in respect to such nitration.

In either case the product is recovered from the nitration mixture by cooling, quenching and filtering.

In order that this invention may be readily available to and understood by those skilled in the art, the following illustrative examples are supplied:

EXAMPLE I

*4,5-Dihydro-6-(5-Nitro-2-Furyl)-Pyridazin-3(2H)-one*

A. *Ethyl β-(2-furoyl)propionate.*—In a 3 liter, three neck round bottom flask is placed 1 liter of dry benzene, 238 g. (1.68 moles) of phosphorus pentoxide, and 171 g. (2.52 moles) of furan. The mixture is stirred vigorously while 245 g. (1.68 moles) of ethyl hydrogen succinate is added slowly during 20 mins. The reaction mixture is warmed near boiling by means of a mantle, and an additional 50 g. (0.74 mole) of furan is added. After refluxing for 4 hrs. with vigorous stirring, the mixture is chilled and the benzene layer is decanted from the sludge. The sludge is washed with benzene in several small portions. The combined benzene solution is washed with 400 ml. of 10% potassium hydroxide solution in two portions. This is followed by one washing with 250 ml. of water. After drying the extracts over anhydrous magnesium sulfate overnight, the solvent is removed in vacuo on a steam bath. The yield of crude product as an oil is 140 g. (81.5%).

B. *4,5 - dihydro-6-(2-furyl)-pyridazin-3(2H)-one.*—A solution of 140 g. (0.82 mole) of A and 150 ml. of 85% hydrazine hydrate in 1 liter of ethanol is refluxed for 1 hour. After removing the solvent in vacuo on a steam bath, the residue is poured into 500 ml. of water and chilled thoroughly. The yield of crude product as yellow needles melting at 143–145° C. is 99 g. (74%).

C. *4,5-dihydro-6-(5-nitro - 2 - furyl)-pyridazin-3(2H)-one.*—To 400 ml. of concentrated sulfuric acid in a 1 liter, 3 neck flask, chilled to 5° C., is added in small portions with stirring 51.5 g. (0.31 mole) of b. The resulting solution is chilled to 0° C. by means of an ice salt bath. A chilled solution of 50 ml. of concentrated nitric acid in 100 ml. of concentrated sulfuric acid is added dropwise with stirring at 0–5° C. during ca. 0.5 hr. Stirring is continued at ca. 5° C. for 15 minutes after which the reaction mixture is poured, in a slow stream with stirring, into 3 liters of ice water. The crude product is collected by filtration and is washed thoroughly with cold water. Recrystallization from glacial acetic acid, using charcoal, gives the product as needles melting at 245–246° C. dec. in a yield of 27.6 g. (42%). A second recrystallization raises the melting point to 249.5–250° C. dec.

*Analysis.*—Calcd. for $C_8H_7N_3O_4$: C, 45.94; H, 3.37; N, 20.09. Found: C, 45.81, 45.79; H, 3.06; N, 20.04, 19.98.

EXAMPLE II

4,5-Dihydro-6-(5-Nitro-2-Furyl)-as-Triazin-3(2H)-One

A. *N-carbethoxyaminomethyl 2 - furyl ketone.*—A 3 liter, three neck flask, fitted with condenser, stirrer and addition funnel, is charged with 108 g. (0.65 mole) of aminoethyl 2-furyl-ketone hydrochloride and 800 ml. of water. To this solution is added dropwise with stirring during 10 minutes a solution of 106 g. (0.65 mole) of pyridine in 200 ml. of ether. This is followed by the dropwise addition during 1 hour of 73.6 g. (0.65 mole) of ethyl chloroformate in 200 ml. of ether. After completing the addition, stirring is continued in the cold for 6 hrs. The reaction mixture is transferred to a 2-liter separatory funnel, and the layers are separated. The ether layer is saved. The aqueous layer is transferred to a liquid-liquid extractor and extracted with ether continuously overnight. The combined ether extracts are dried over magnesium sulfate, and the ether is removed under reduced pressure on a warm water bath. The residue is stirred with 300 ml. of cold ligroin (B.P. 70–80° C.) until crystallization occurs. The product is collected by filtration and air dried. The yield of crude product melting at 63–65° C. is 88.5 g. (67.1%). Recrystallization may be effected from ether-petroleum ether.

B. *4,5 - dihydro-6-(2-furyl)-as-triazin-3(2H)-one.*—A mixture of 82.6 g. (0.42 mole) of N-carbethoxyamino-methyl-2-furyl-ketone and 120 ml. of 85% hydrazine hydrate in 750 ml. of water is refluxed for 20 hrs.

A 10% aqueous solution of potassium hydroxide (100 ml.) is added, and refluxing is continued for 1 hour. The solution is chilled in an ice-salt bath for 2 hrs. to induce the product to crystallize. The product is collected by filtration, washed thoroughly with cold water, and dried at 60° C. The yield of crude product as needles melting at 167–168.5° C. is 41.3 g. (59.5%). Recrystallization from dilute aqueous ethanol gives the product as needles melting at 168.5–169.5° C.

C. *4,5-dihydro - 6 - (5-nitro-2-furyl)-as-triazin-3(2H)-one.*—A 500 ml., three neck flask, fitted with thermometer and stirrer, is charged with 10.0 g. (0.06 mole) of finely powdered 4,5 - dihydro-6-(2-furyl)-as-triazin-3(2H)-one (see B) and 300 ml. of chloroform. The suspension is heated to boiling with stirring, and is allowed to cool to 50° C. With stirring and while maintaining a temperature of about 45–50° C., 25 ml. of concentrated nitric acid is added in portions of ca. 1 ml. so that coalescence is promoted throughout the addition. After chilling the dark red, homogeneous solution to 10° C., 150 ml. of cold water is added in one portion. The product separates instantly as yellow crystals. The crude product is collected by filtration and is washed thoroughly with cold water in portions. The crude product, when air dried, weighs 9.0 g. (70%), and decomposes at 205–210° C.

Recrystallization from 40% aqueous acetic acid, using charcoal, affords a 40% recovery of product as needles melting at 253–254° C. dec. A second recrystallization gives a melting point of 249–250° C. dec.

Further recrystallizations give a melting point of 244–245.5° C. dec.

*Analysis.*—Calcd. for $C_7H_6N_4O_4$: C, 40.00; H, 2.88; N, 26.66. Found: C, 40.25, 40.16; H, 2.94, 2.89; N, 26.84, 26.74.

What is claimed is:
1. The compound of the formula:

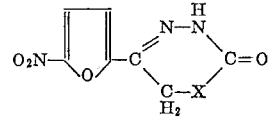

wherein X represents a radical selected from the group consisting of methylene and imido.

2. 4,5-dihydro-6-(5-nitro - 2 - furyl)-pyridazin-3(2H)-one.

3. 4,5-dihydro-6-(5-nitro - 2 - furyl)-as-triazin-3(2H)-one.

References Cited in the file of this patent
UNITED STATES PATENTS 2,898,335    Michels _____ Aug. 4, 1959

FOREIGN PATENTS 217,463    Austria _____ Oct. 10, 1961

OTHER REFERENCES

Knott: Journal of the Chemical Soc., (London), Pt. II, pp. 1190–1195, 1947.

Erickson et al.: "The 1, 2, 3 and 1, 2, 4-Triazines, Tetrazines and Pentazines," 1956, p. 66.